United States Patent
Moyer et al.

(10) Patent No.: US 7,823,033 B2
(45) Date of Patent: Oct. 26, 2010

(54) DATA PROCESSING WITH CONFIGURABLE REGISTERS

(75) Inventors: William C. Moyer, Dripping Springs, TX (US); Jimmy Gumulja, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1126 days.

(21) Appl. No.: 11/460,090

(22) Filed: Jul. 26, 2006

(65) Prior Publication Data
US 2008/0126769 A1 May 29, 2008

(51) Int. Cl.
G01R 31/28 (2006.01)
G01R 31/26 (2006.01)
G11C 29/00 (2006.01)

(52) U.S. Cl. .................. 714/724; 714/732; 365/201; 324/765

(58) Field of Classification Search .......... None
See application file for complete search history.

(56) References Cited

U.S. PATENT DOCUMENTS

| | | | |
|---|---|---|---|
| 3,671,940 A | 6/1972 | Kronies et al. | |
| 3,839,705 A | 10/1974 | Davis et al. | |
| 4,042,914 A | 8/1977 | Curley et al. | |
| 4,513,418 A | 4/1985 | Bardell, Jr. et al. | |
| 4,679,194 A | 7/1987 | Peters et al. | |
| 5,475,852 A * | 12/1995 | Yoshida et al. | ............ 714/34 |
| 5,485,467 A | 1/1996 | Golnabi | |
| 5,541,879 A | 7/1996 | Suh et al. | |
| 5,617,021 A | 4/1997 | Goetting et al. | |
| 5,672,966 A | 9/1997 | Palczewski et al. | |
| 5,699,506 A | 12/1997 | Phillips et al. | |
| 5,841,867 A | 11/1998 | Jacobson et al. | |
| 5,900,757 A | 5/1999 | Aggarwal et al. | |
| 6,128,755 A | 10/2000 | Bello et al. | |
| 6,311,311 B1 | 10/2001 | Swaney et al. | |

(Continued)

OTHER PUBLICATIONS

Crouch, Alfred L.; "Scan Testing"(3.1.3) and "Logic Built-in Self-Test" (3.27.3)"Design for Test for Digital IC's and Embedded Core Systems"; 1999; Title page, Publication Data page, 2 pg Contents, pp. 96-168; Prentice Hall; New Jersey, USA.

(Continued)

*Primary Examiner*—Kevin L Ellis
*Assistant Examiner*—Guerrier Merant
(74) *Attorney, Agent, or Firm*—Robert L. King; Joanna G. Chiu

(57) ABSTRACT

A data processing system includes functional circuitry which performs at least one data processing function, a register file coupled to the functional circuitry and having a plurality of general purpose registers (GPRs) which are included as part of a user's programming model for the data processing system, where a portion of the plurality of GPRs are reconfigurable as test registers during a test mode, and control circuitry which provides a test enable indicator to the register file. The portion of the plurality of GPRs, in response to the test enable indicator indicating the test mode is enabled, operates to accumulate test data from predetermined circuit nodes within the functional circuitry. In one aspect, the portion of the plurality of GPRs are reconfigured as multiple input shift registers (MISRs) during the test mode and generate signatures based on the test data.

20 Claims, 3 Drawing Sheets

U.S. PATENT DOCUMENTS

| | | |
|---|---|---|
| 6,393,594 B1 | 5/2002 | Anderson et al. |
| 6,438,722 B1 | 8/2002 | Bailey et al. |
| 6,541,879 B1 | 4/2003 | Wright |
| 2002/0129300 A1 | 9/2002 | Floyd et al. |
| 2002/0178403 A1 | 11/2002 | Floyd et al. |
| 2004/0216061 A1 | 10/2004 | Floyd et al. |
| 2006/0282732 A1 | 12/2006 | Kiryu |
| 2007/0089095 A1 | 4/2007 | Thekkath et al. |
| 2007/0168736 A1 | 7/2007 | Ottavi et al. |

OTHER PUBLICATIONS

Lyon, Jose A. et al; "Testability Features of the 68HC16Z1"; International Test Conference 1991; Oct. 26-30, 1991; pp. 122-129 + 2 cover sheets and index; IEEE.

U.S. Appl. No. 11/355,681, filed Feb. 16, 2006.

* cited by examiner

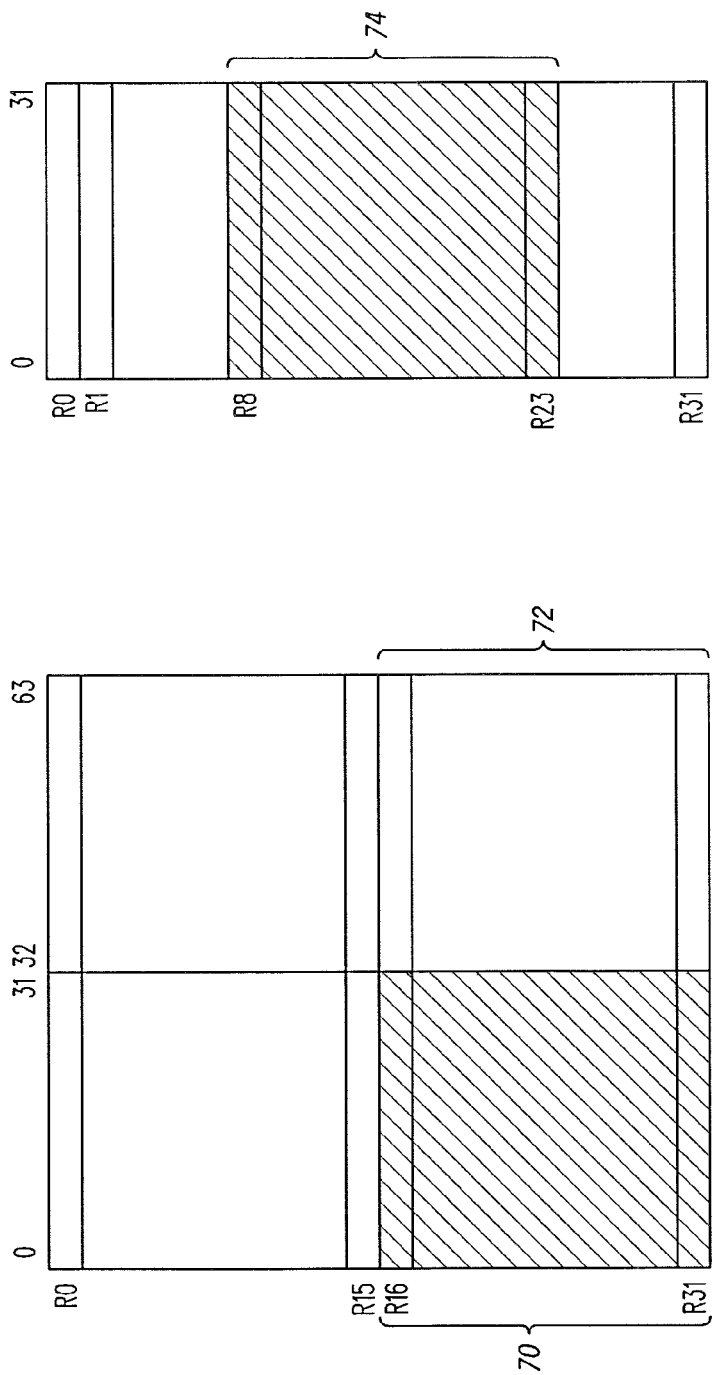
FIG. 4
FIG. 5
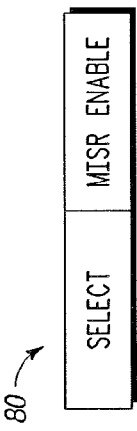
FIG. 6

DATA PROCESSING WITH CONFIGURABLE REGISTERS

RELATED APPLICATION

The present invention is related to the applications entitled:
(1) "Method and Apparatus For Testing A Data Processing System" filed on Feb. 16, 2006 and having a U.S. Ser. No. of 11/355,681, now U.S. Pat. No. 7,444,568, and assigned to the same assignee as the present application; and
(2) "Pipelined Processor With Deterministic Signature Generation" filed of even date herewith, U.S. Ser. No. 11/460,086, now U.S. Pat. No. 7,627,795, and assigned to the same assignee as the present application.

FIELD OF THE INVENTION

The present invention relates generally to data processors, and more particularly to testing a data processor.

BACKGROUND OF THE INVENTION

Testing of data processing systems is important to ensure proper operation. Testing may be performed in a factory following manufacture and prior to using the data processing system in a user application. The factory testing ensures an end user receives a properly functioning product. However, during operation of the data processing system by an end user, it may also be desirable to test the data processing system so that any failures which occur during normal operation of the product can be detected.

A well known technique to permit integrated circuits to be tested during operation is the use of logic testing registers, called Multiple Input Shift Register (MISR). Multiple input shift registers implement any of a variety of polynomials by receiving data from various internal nodes of the integrated circuit and performing signature compression and accumulation. The signature compression and accumulation is a series of logic operations which result in a single output value known as a signature value. The signature value is compared with a desired value to determine whether the integrated circuit being tested is functioning correctly.

Since the testing of the integrated circuit is performed on-line or while the integrated circuit is functioning in a real-world application, the circuitry for implementing the MISR and associated control must be implemented within the integrated circuit. Due to the size of a MISR and therefore expense, the number of MISRs and the implementation size of a MISR may be limited. As a result the ability to test the integrated circuit is severely limited.

BRIEF DESCRIPTION OF THE DRAWINGS

The present invention is illustrated by way of example and not limitation in the accompanying figures, in which like references indicate similar elements, and in which:

FIG. 4 illustrates in table form an example of a register file configuration in accordance with one form of the present invention;

FIG. 5 illustrates in table form another example of a register file configuration in accordance with another form of the present invention; and FIG. 6 illustrates in diagram form an exemplary command or instruction to be used by the global control circuitry of the data processing system of FIG. 1.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Figure 1:
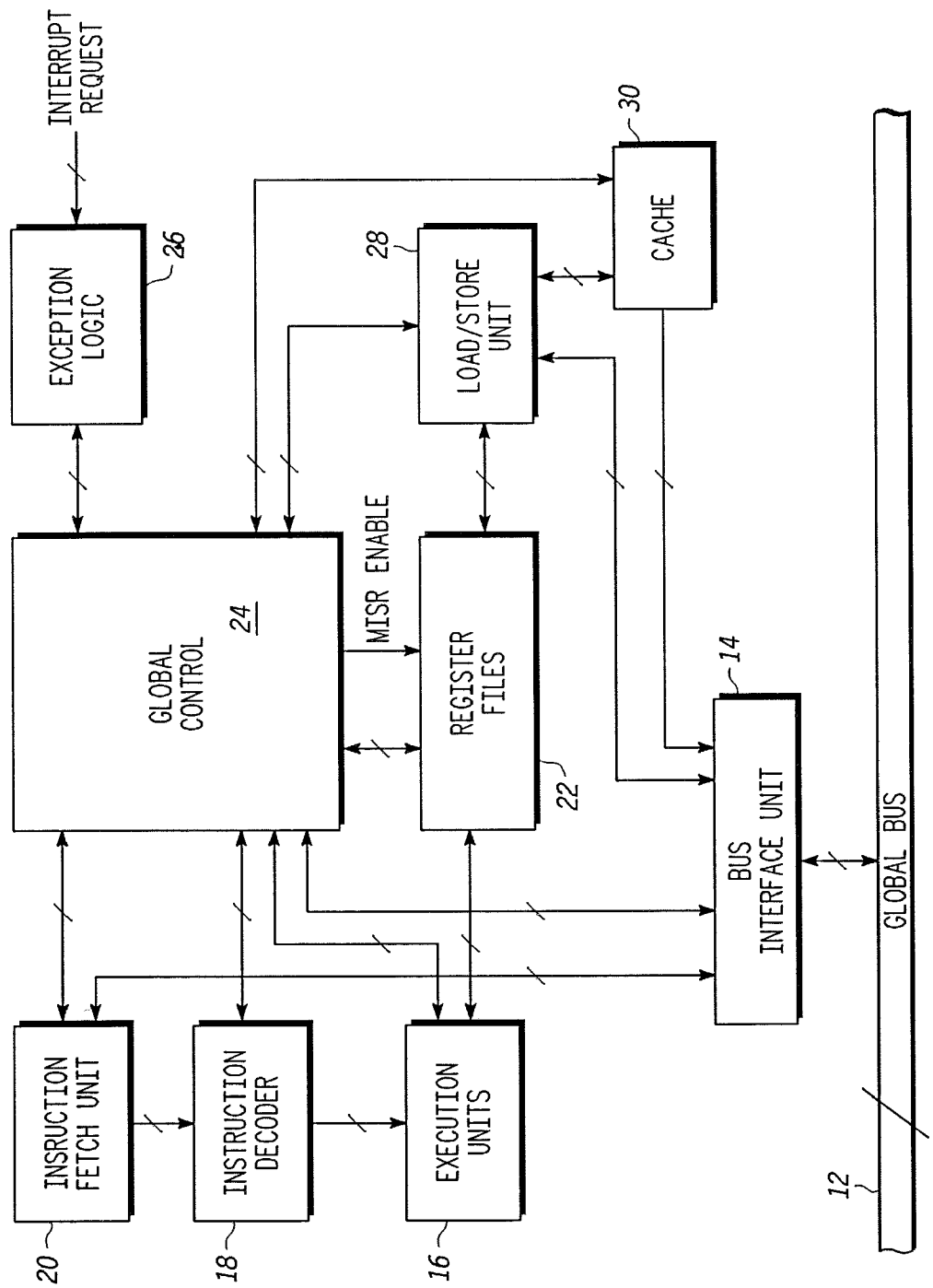
FIG. 1 illustrates a block diagram of a data processing system in accordance with one embodiment of the present invention.

FIG. 1 illustrates a data processing system 10 having register files that are configurable for normal operation and for test operation. Thus the registers of the register files are reconfigurable. A multiple-bit global bus 12 functions to communicate data within the data processing system 10. A bus interface unit (BIU) 14 has an input and an output connected to the global bus 12. The data processing system 10 also includes one or more execution units 16, an instruction decoder 18, an instruction fetch unit 20, register files 22, global control 24, exception logic 26, a load/store unit 28 and a cache 30. A first input/output of the bus interface unit 14 is connected to a first input/output of the instruction fetch unit 20. A second input/output of the bus interface unit 14 is connected to a first input/output of the global control 24. A third input/output of the bus interface unit 14 is connected to a first input/output of the load/store unit 28. A fourth input/output of the bus interface unit 14 is connected to an output of cache 30. A second input/output of the instruction fetch unit 20 is connected to a second input/output of the global control 24. A third input/output of the global control 24 is connected to a second input/output of the one or more execution units 16. A third input/output of execution units 16 is connected to a first input/output of register files 22. A fourth input/output of the global control 24 is connected to an input/output of the instruction decoder 18. A fifth input/output of the global control 24 is connected to an input/output of the exception logic 26. Exception logic 26 also has an input for receiving an Interrupt Request signal. A sixth input/output of the global control 24 is connected to a first input/output of the cache 30. A seventh input/output of the global control 24 is connected to a second input/output of the load/store unit 28. An eighth input/output of the global control 24 is connected to a second input/output of register files 22. An output of the global control 24 provides a MISR Enable signal to an input of the register files 22 and functions as a select signal to select between a MISR test mode and a normal operation mode. A second input/output of the load/store unit 28 is connected to a third input/output of the register files 22. A fourth input/output of the load/store unit 28 is connected to a second input/output of the cache 30. It should be understood that other forms of data processing system 10 may not utilize cache 30 but rather use memory that is located outside of the data processing system 10. It should also be understood that the location of control circuitry within the data processing system 10 is implementation specific. For example, various control circuits are located within each of the functional units of the instruction fetch unit 20, the instruction decoder 18, the execution units 16 and the register files 22 for more limited control than the global control 24.

In operation, data processing system 10 is implemented as a pipelined data processing system. That means that the execution of data processing instructions functions in discrete time intervals in which a particular function in the execution occurs during each time interval. In one form, instruction execution advances in a pipeline in response to a system clock, wherein each cycle of the system clock advances the execution by one stage. In a first operation, an instruction is fetched in a first pipeline stage from the bus interface unit 14 by the instruction fetch unit 20. In a second pipeline stage, the fetched instruction is coupled to the instruction decoder 18 from the instruction fetch unit 20 and decoded. The resulting decoded instruction is then coupled to execution units 16 and instruction execution begins in a third pipeline stage. In some forms, the instruction execution occurs during two cycles of the system clock. In one form, the execution stage of the pipeline has two phases of instruction execution. Depending upon the functionality of the executed instruction, the result of the pipelined operation may be fed back to the input of the pipeline and used as a subsequent input. In a final stage of the pipeline a write back to memory, such as the cache 30, is performed. The various pipeline stages which are described herein are defined herein as "staging". In other words, staging is the operation of data processing system in specific stages each having a predetermined function or functions. Staging is also the association of specific hardware circuitry with the functions of each stage in the ordered sequence which forms the data processing pipeline.

Registers files 22 are shared between the load/store unit 28 and the execution units 16. The load/store unit 28 operates in response to the global control 24 and provides data to and receives data from the bus interface unit 14. The load/store unit 28 also provides data to and receives data from the general purpose registers within the register files 22. Exception logic 26 functions to generate any of various types of data processing exceptions. An interrupt request may be generated and provided to the exception logic 26 in response to various events either within the illustrated data processing system 10 or from sources external to the data processing system 10. For example, instruction execution latency resulting from the generation of wait states may cause the generation of an exception as well as the occurrence of faults resulting from instruction execution errors. Various types of real-time interrupt requests may also be received by exception logic 26 via one or more interrupt request inputs.

The discussion of the operation of data processing system 10 to this point is conventional. Additionally, data processing system 10 has a real-time test capability that permits testing of various test points located at predetermined circuit nodes within the functional circuitry of data processing system 10. For example, the various test points may be located within any or all of the functional blocks illustrated in FIG. 1. The real-time testing of data processing system 10 is accomplished with one or more MISR circuits. However, the implementation of shift registers dedicated for the sole purpose of test would represent a significant amount of the area of the data processing system. To avoid the penalty of dedicating a large amount of area for the purpose of test, data processing system 10 uses register files 22 that are configurable to function as both general purpose registers and as registers for a test function such as a MISR.

A MISR functions to receive test data from various test locations within the system as the system is exercised. The MISR compresses the multiple test values by performing a plurality of predetermined logic operations that are determined by which test polynomial is selected. The compressed MISR result is typically referred to as a MISR signature. The value of the MISR signature and the structure of the MISR itself are polynomial specific and test point specific, and will vary from implementation to implementation. After exercising the system for a predetermined interval, the MISR result is compared with an expected MISR value for the implemented polynomial and a determination is made whether the data processing system is working correctly based on the comparison. Multiple MISR registers may be implemented to allow for a larger number of test points to be captured for signature generation. The advantage in increasing the number of MISRs is to allow for broader test coverage but comes at the penalty of additional size and cost of the system. Further explanation below is required to appreciate how the configurable registers within register files 22 provide the ability to dually use storage devices in data processing system 10 for normal operation and for test without negatively impacting the size of the system.

Figure 2:
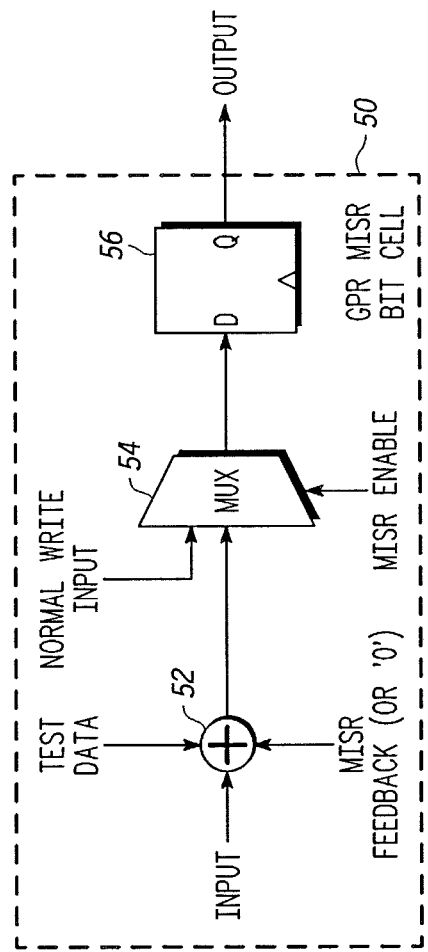
FIG. 2 illustrates a block diagram of data storage circuitry that functions dually as a general purpose register (GPR) and as a MISR bit cell.

Illustrated in FIG. 2 is a block diagram of an exemplary storage device of a bit cell which functions as a general purpose register (GPR) bit and as a MISR bit. As a general purpose register, the register is included as part of a user's programming model for the data processing system. The general purpose registers are utilized for storing data values used as source values and result values during the execution of processor instructions, and constitute a portion of the programming model available to a user of the data processing system. Typical data processors implement a plurality of GPRs for use as source and destination values. Typical processing systems may implement sixteen, thirty-two or sixty-four GPRs. General purpose registers are well known.

Referring to FIG. 2, GPR MISR bit cell 50 has an exclusive OR gate 52 having a first input for receiving an Input value, a second input for receiving Test Data and a third input for receiving a signal labeled "MISR Feedback". Alternatively the third input may be connected to a logic zero value and thus not influence the value of an output of exclusive OR gate 52. The output of exclusive OR gate 52 is connected to a first input of a multiplexor (Mux) 54. A second input of multiplexor 54 is connected to a Normal Write Input signal for receiving a digital value in the normal mode of operation to be written to or stored by the GPR MISR bit cell 50, such as the result of executing a processor instruction which designates the GPR as a destination register. A control input of multiplexor 54 receives the MISR Enable signal from global control 24. The MISR Enable signal selects the output of exclusive OR gate 52 when asserted. An output of multiplexor 54 is connected to a data (D) input of a flip-flop 56. A data (Q) output of flip-flop 56 provides an Output signal. Flip-flop 56 is clocked by clock signal (not shown) provided by global control 24 which controls the timing of when a value that is output by multiplexor 54 is stored. Thus it should be apparent that the GPR MISR bit cell 50 is configurable by the MISR Enable signal to function as either a MISR bit cell or as a general purpose register bit cell to capture and store data in a normal mode of operation. As a result a dual function is provided by the GPR MISR bit cell 50.

Figure 3:
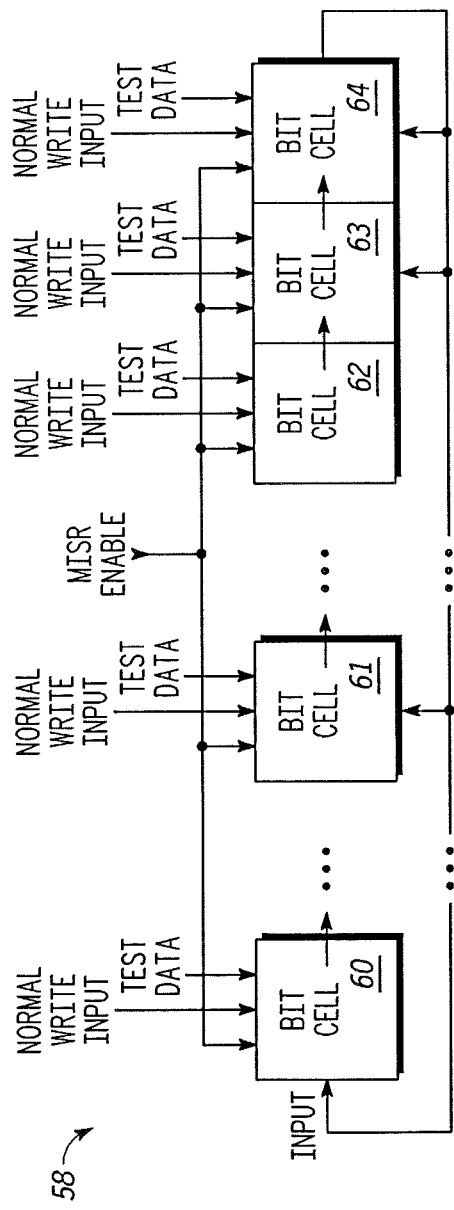
FIG. 3 illustrates a block diagram of a configurable MISR in accordance with one embodiment of the present invention.

Illustrated in FIG. 3 is a block diagram implementation of a MISR 58. The MISR 58 is implemented with a plurality of serially connected bit cells 60-64, each of which is analogous to GPR MISR bit cell 50. A predetermined number of bit cells is used to implement a MISR wherein the predetermined number is typically a multiple of two. Each of bit cells 60-64 has an input, a Test Data input, a Normal Write input and a MISR Enable signal input. Bit cell 60 receives as feedback at its input the output of bit cell 64. The output of bit cell 64 is also connected to the third input of the exclusive OR gate analogous to exclusive OR gate 52 of predetermined bit cells 61, 63 and 64. Which bit cell or cells receives the MISR feedback is polynomial specific. It should be apparent that each of bit cells 60-64 receives test data from differing predetermined test points within the data processing system 10. The received test data is selected and provided to the exclusive OR gate, such as exclusive OR gate 52, of the bit cell, with the result stored in each respective bit cell in response to the MISR Enable signal. Additionally, each of bit cells 60-64 alternatively stores normal instruction execution result information which is written into storage when the MISR Enable signal in inactive and indicates a normal mode (i.e. non-test mode) of operation. Therefore, MISR capability is provided in a subset of the GPRs of the data processing system 10. The MISR function is controllable by software to switch between a test mode and a normal mode. When operating in the MISR mode of operation, the subset of GPRs which are implemented with GPR MISR bit cells as the storage elements act normally as source operands and are updated at selected points in time as MISRs to collect and accumulate information about various signal points in the data processing system 10. Therefore MISR signature generation may occur during a sequence of tests that utilize normal instruction execution to stimulate the data processing system. During execution of the test sequence of normal processor instructions, test values from the various test data points connected to the test data inputs of the GPR MISR bit cells are accumulated in the corresponding MISR. At the end of the test sequence, the GPR values are read out by normal data processing instruction execution as MISR signature values, and are compared to expected results to determine whether a failure has occurred during execution of the test sequence of instructions. Differing MISR modes can be implemented in which the GPRs can also capture merged destination data. In alternate embodiments, data merging of the normal write data into the exclusive OR gates may be implemented by providing a fourth input (not shown) to the exclusive OR gate 52 of some or all of the GPR MISR bit cells. This allows for further testing of the data processing system 10 to occur without additional test sequences, since the normal results of instruction execution can be compressed into the MISR signature in parallel with compression of the test data.

During execution of testing code when data processing system 10 is in the test mode, the subset of GPRs that is dedicated for MISR functionality is typically unavailable for use as general purpose registers. Therefore, the selection of which general purpose registers to implement the enhanced MISR functionality is made to ensure that no essential processor capability is lost. Therefore proper selection of a subset of general purpose registers will be discussed.

Illustrated in FIG. 4 is an exemplary register mapping of a portion of the register files 22 of FIG. 1. As an example, thirty-two contiguous registers labeled R0 through R31 are illustrated wherein each register is sixty-four bits wide. In the example, a portion 70 of registers R16-R31 is selected as the registers that will be configurable as MISRs. It is of course relevant that these registers continue to function normally as source operands to instructions that are executed. In one form, a portion 72 of registers R16 through R31 is provided which are not configurable between normal and test modes of operation. This provides the possibility that a portion of one register line may be configured to operate in the test mode of operation and a remaining portion of that register line is configured to always remain in a normal mode of operation. In one embodiment the selection of what subset of GPRs is made configurable is based on a software Application Binary Interface (ABI) which describes the low-level interface between an application program and the operating system, between an application and its libraries, or between component parts of the application. In many applications, the use of all the registers in the GPR registry is not required for instruction execution and a determination of any GPR capacity that is not essential to the software results in good candidates for becoming configurable registers. In the embodiment shown in FIG. 4, many processing instructions do not require a full sixty-four bits of information to be used during instruction processing. Thus, the upper thirty-two bits of the general purpose registers are not utilized and are available for configuration as MISRs. To ensure that those processing instructions which do require sixty-four bit operands are still available for use, only a portion of a subset of the GPRs are configurable, namely registers R16 through R31. General purpose registers R0 through R15 are not configurable, and function normally in the test mode of operation. Thus registers R0 through R15 are available for use by instructions requiring sixty-four bit general purpose values.

It should be noted also that the registers which are selected as being configurable may still be used in the test mode of operation as general purpose source registers. In other words, these registers may function normally as source operands to instructions. The values that are in the flip-flops of the bit cells 60-64 of the registers configured as MISRs during test mode provide a useful source of pseudo-random source values or test vectors for exercising logic within the data processing system. Since the MISRs are accumulating as execution proceeds, pseudo-random values are continuously generated. Therefore, during the test mode at least one register in the portion of the GPRs that are configured as one or more MISRs is used as a source register for a processor instruction that is executed by data processing system 10. In one form, that processor instruction performs an operation such as an arithmetic operation, a logic operation or an effective address calculation.

Illustrated in FIG. 5 is another example of a register mapping of the register files 22 of FIG. 1. In this example thirty-two registers, R0 through R31 are illustrated. A portion 74 or subset of the registers are designated by cross-hatching to be configurable to operate as both general purpose registers and as MISR registers. In the illustrated form portion 74 includes registers R8 through R23. In this form each register is thirty-two bits wide and all of the register width is made configurable. In one form, the selection of what subset of GPRs is made configurable is based on a software Application Binary Interface (ABI) which describes the low-level interface between an application program and the operating system, between an application and its libraries, or between component parts of the application. In many applications, the use of all the registers in the GPR registry is not required for instruction execution, and a determination of any GPR capacity that is not essential to the software results in good candidates for becoming configurable registers. In the embodiment shown in FIG. 5, the selection of registers to operate as MISR registers in the test mode of operations has been made based upon a convention for register usage by an ABI. In this convention, registers r8-r23 are not absolutely essential for proper operation of the data processor, provided that some limitations are placed on the ABI regarding register usage. It is desired to minimize the impact on the ABI in all cases, and the selected registers result in a minimized impact. In one embodiment, by ABI convention, general purpose registers R0 and R3-R7 are used as temporary or "volatile" registers. Register R1 is used as a stack pointer, register R2 is used as a pointer to a small data area, and registers R24-R31 are used as non-volatile registers to hold non-volatile data. In one form, registers R3-R7 are used by convention as argument passing registers to pass arguments and return results between software functions in compliance with an ABI function calling convention.

Such register usage conventions are well known and serve to promote interoperability of different compiled software functions. Proper selection of the GPRs to be used as MISR registers during the test mode is thus critical to minimize the impact on the calling convention and interoperability. It should be noted that the test mode relies on execution of normal software functions to provide the stimulus to the data processing system, and that the test data values which are accumulated into one or more MISR signature values are generated as a result of normal execution of normal, not special, processor instructions using the instructions available to the user outside of the test mode of operation, and for the most part using the same ABI conventions on general purpose register usage.

Illustrated in FIG. 6 is a command 80 having two fields which respectively function to select test points in data processing system 10 and to enable the test mode. The command 80 has a first field labeled "select" which controls which test points are coupled as the test data to the respective test data inputs of bit cells 60-64. The select information of command 80 is used by circuitry (not shown) such as a multiplexor that determines a specific predetermined test point within data processing system 10 for each test data input. Thus the determination of what points within the data processing system 10 to test is user programmable in real-time fashion. The second field of command 80 is labeled "MISR enable" and is the signal that the global control 24 provides to each GPR MISR bit cell to enable and disable the test mode of operation. Therefore the collection of test information at predetermined points in the data processing system 10 is within user control and is programmable.

By now it should be appreciated that there has been provided a method of operation and a data processing system that has configurable MISR capability for a portion of a general purpose register file. It should be understood that the portion may vary from a small subset of the general purpose register files to a substantial portion of the general purpose register files. The readily configurable MISR registers discussed herein satisfy a customer requirement that a data processing system be available for processing to meet system needs in safety applications and to ensure that critical applications are not interrupted. The configurable test capability disclosed herein provides a low cost and flexible method of adding signature test logic to a data processing system. Size is minimized by the time multiplexed use of a portion of the general purpose registers for this function.

In one form there is herein provided a method of providing a plurality of general purpose registers (GPRs) which are included as part of a user's programming model for a data processing system. A test mode is entered. During the test mode, a portion of the plurality of GPRs is configured to operate as at least one multiple input shift register (MISR). During the test mode, each register in the portion of the plurality of GPRs generates a signature. The test mode is exited. After exiting the test mode, the portion of the plurality of GPRs is used as general purpose registers for normal program execution. In one form the portion of the plurality of GPRs is configured to operate as at least one MISR by implementing one or more bit cells of each register in the portion of the plurality of general purpose registers with at least one logic gate. During the test mode, the at least one logic gate receives a first input from another bit cell and the at least one logic gate provides an output to yet another bit cell. Test data is provided from test points located at predetermined circuit nodes within the data processing system to a second input of the at least one logic gate. In one form the portion of the plurality of GPRs corresponds to a selected subset of registers of the plurality of GPRs. In another form the selected subset of registers is selected based on a software Application Binary Interface (ABI). In yet another form the portion of the plurality of GPRs corresponds to a subset of bit locations within each register of a selected subset of registers of the plurality of GPRs. In another form remaining bit locations within each register of the selected subset of registers of the plurality of GPRs continue to operate as general purpose registers for normal program execution during the test mode. In yet another form the subset of bit locations corresponds to higher order bit locations within the each register of the selected subset of registers of the plurality of GPRs. In another form during test mode, at least one register in the portion of GPRs configured as the at least one MISR is used as a source register for a processor instruction executed by the data processing system. In another form the processor instruction performs an operation selected from a group consisting of an arithmetic operation, a logic operation, or an effective address calculation.

In another form there is provided a data processing system having functional circuitry which performs at least one data processing function. A register file is coupled to the functional circuitry and has a plurality of general purpose registers (GPRs) which are included as part of a user's programming model for the data processing system. A portion of the plurality of GPRs is reconfigurable as at least one test register during a test mode. Control circuitry provides a test enable indicator to the register file, wherein the portion of the plurality of GPRs, in response to the test enable indicator indicating the test mode is enabled, operates to accumulate test data from predetermined circuit nodes within the functional circuitry. In another form the portion of the plurality of GPRs, in response to the test enable indicator indicating the test mode is enabled, operates to accumulate test data from the predetermined circuit nodes within the functional circuitry and generates a signature used to test functionality of the functional circuitry. In another form the at least one test register is at least one multiple input shift register (MISR). In another form the register file further includes selecting circuitry coupled to each bit cell in each register of the portion of the plurality of GPRs. The selecting circuitry selects between providing a normal write input and providing a test input. In another form the selecting circuitry provides the normal write input when the test enable indicator indicates that test mode is not enabled and provides the test input when the test enable indicator indicates that test mode is enabled. In yet another form the portion of the plurality of GPRs corresponds to a subset of bit locations within each register of a selected subset of registers of the plurality of GPRs. In another form remaining bit locations within each register of the selected subset of registers of the plurality of GPRs continue to operate as general purpose registers for normal program execution during the test mode.

Also there is provided a data processing system having functional circuitry which performs at least one data processing function. A register file has a plurality of general purpose registers (GPRs) which are included as part of a user's programming model for the data processing system. A portion of the plurality of GPRs are reconfigurable as at least one multiple input shift register (MISR) during a test mode. Control circuitry provides a test enable indicator to the register file, wherein each register in the portion of the plurality of GPRs, in response to the test enable indicator indicating that the test mode is enabled, operates as a multiple input shift register (MISR) to generate a signature based on test data received from predetermined circuit nodes within the functional circuitry. In another form the register file has selecting circuitry for each bit cell in each register of the portion of the plurality of general purpose registers. The selecting circuitry selects between providing a normal write input and providing a test input based at least in part on the test data received from the predetermined circuit nodes within the functional circuitry. A logic gate is in each bit cell in each register of the portion of the plurality of general purpose registers. Each logic gate is coupled to receive at least a portion of the test data from the predetermined circuit nodes within the functional circuitry and coupled to provide the test input to the selecting circuitry. In another form the selecting circuitry provides the normal write input when the test enable indicator indicates that test mode is not enabled and provides the test input when the test enable indicator indicates that test mode is enabled. In another form the portion of the plurality of GPRs corresponds to a subset of bit locations within each register of a selected subset of registers of the plurality of GPRs.

In the foregoing specification, the invention has been described with reference to specific embodiments. However, one of ordinary skill in the art appreciates that various modifications and changes can be made without departing from the scope of the present invention as set forth in the claims below. It should be understood that all circuitry described herein may be implemented either in silicon or another semiconductor material or alternatively by software code representation of silicon or another semiconductor material. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

What is claimed is:

1. In a data processing system, a method comprising:
   providing a plurality of general purpose registers (GPRs) which are included as part of a user's programming model for the data processing system;
   entering a test mode;
   during the test mode, configuring a portion of the plurality of general purpose registers to operate as at least one multiple input shift register (MISR) wherein a portion of a register line is configured to operate in the test mode and a remaining portion of the register line is configured to remain in a normal mode of operation;
   during the test mode, each register in the portion of the plurality of general purpose registers generating a signature;
   exiting the test mode; and
   after exiting the test mode, using the portion of the plurality of general purpose registers as general purpose registers for normal program execution.

2. The method of claim 1, wherein the configuring the portion of the plurality of general purpose registers to operate as at least one MISR comprises:
   implementing one or more bit cells of each register in the portion of the plurality of general purpose registers with at least one logic gate wherein, during the test mode, the at least one logic gate receives a first input from another bit cell and the at least one logic gate provides an output to yet another bit cell; and
   providing test data from test points located at predetermined circuit nodes within the data processing system to a second input of the at least one logic gate.

3. The method of claim 1, wherein the portion of the plurality of general purpose registers correspond to a selected subset of registers of the plurality of general purpose registers.

4. The method system of claim 3, wherein the selected subset of registers is selected based on a software Application Binary Interface (ABI).

5. The method of claim 1, wherein the portion of the plurality of general purpose registers corresponds to a subset of bit locations within each register of a selected subset of registers of the plurality of general purpose registers.

6. The method of claim 5, wherein remaining bit locations within each register of the selected subset of registers of the plurality of general purpose registers continue to operate as general purpose registers for normal program execution during the test mode.

7. The method of claim 5, wherein the subset of bit locations corresponds to higher order bit locations within the each register of the selected subset of registers of the plurality of general purpose registers.

8. The method of claim 1, further comprising:
   during test mode, using at least one register in the portion of general purpose registers configured as the at least one MISR as a source register for a processor instruction executed by the data processing system.

9. The method of claim 8, wherein the processor instruction performs an operation selected from a group consisting of an arithmetic operation, a logic operation, or an effective address calculation.

10. A data processing system, comprising:
    functional circuitry which performs at least one data processing function;
    a register file coupled to the functional circuitry and having a plurality of general purpose registers (GPRs) which are included as part of a user's programming model for the data processing system, wherein a portion of the plurality of general purpose registers are reconfigurable as at least one test register during a test mode, a portion of a register line of the at least one test register is configured to operate in the test mode and a remaining portion of the register line is configured to remain in a normal mode of operation; and
    control circuitry which provides a test enable indicator to the register file, wherein the portion of the plurality of general purpose registers, in response to the test enable indicator indicating the test mode is enabled, operate to accumulate test data from predetermined circuit nodes within the functional circuitry.

11. The data processing system of claim 10, wherein the portion of the plurality of general purpose registers, in response to the test enable indicator indicating the test mode is enabled, operates to accumulate test data from the predetermined circuit nodes within the functional circuitry and generate a signature used to test functionality of the functional circuitry.

12. The data processing system of claim 10, wherein the at least one test register comprises at least one multiple input shift register (MISR).

13. The data processing system of claim 10, wherein the register file further comprises:
selecting circuitry coupled to storage circuitry in each register of the portion of the plurality of GPRs, the selecting circuitry selecting between providing a normal write input to the storage circuitry and providing a test input based at least in part on the test enable indicator.

14. The data processing system of claim 13, wherein the selecting circuitry provides the normal write input when the test enable indicator indicates that test mode is not enabled and provides the test input when the test enable indicator indicates that test mode is enabled.

15. The data processing system of claim 10, wherein the portion of the plurality of general purpose registers corresponds to a subset of bit locations within each register of a selected subset of registers of the plurality of general purpose registers.

16. The data processing system of claim 15, wherein remaining bit locations within each register of the selected subset of registers of the plurality of general purpose registers continue to operate as general purpose registers for normal program execution during the test mode.

17. A data processing system, comprising:
functional circuitry which performs at least one data processing function;
a register file having a plurality of general purpose registers (GPRs) which are included as part of a user's programming model for the data processing system, wherein a portion of the plurality of general purpose registers are reconfigurable as at least one multiple input shift register (MISR) during a test mode, a portion of a register line of the plurality of general purpose registers is configured to operate in the test mode and a remaining portion of the register line is configured to remain in a normal mode of operation; and
control circuitry which provides a test enable indicator to the register file, wherein each register in the portion of the plurality of general purpose registers, in response to the test enable indicator indicating the test mode is enabled, operates as at least a portion of a multiple input shift register (MISR) to generate a signature based on test data received from predetermined circuit nodes within the functional circuitry.

18. The data processing system of claim 17, wherein the register file comprises:
selecting circuitry for each bit cell in each register of the portion of the plurality of general purpose registers, the selecting circuitry selecting between providing a normal write input and providing a test input based at least in part on the test data received from the predetermined circuit nodes within the functional circuitry; and
a logic gate in each bit cell in each register of the portion of the plurality of general purpose registers, each logic gate coupled to receive at least a portion of the test data from the predetermined circuit nodes within the functional circuitry and coupled to provide the test input to the selecting circuitry.

19. The data processing system of claim 18, wherein the selecting circuitry provides the normal write input when the test enable indicator indicates that test mode is not enabled and provides the test input when the test enable indicator indicates that test mode is enabled.

20. The data processing system of claim 17, wherein the portion of the plurality of general purpose registers corresponds to a subset of bit locations within each register of a selected subset of registers of the plurality of general purpose registers.

* * * * *

UNITED STATES PATENT AND TRADEMARK OFFICE
CERTIFICATE OF CORRECTION

PATENT NO. : 7,823,033 B2  
APPLICATION NO. : 11/460090  
DATED : October 26, 2010  
INVENTOR(S) : William C. Moyer and Jimmy Gumulja It is certified that error appears in the above-identified patent and that said Letters Patent is hereby corrected as shown below:

Title page, item (54), and in the Specifications, Column 1, lines 1-2; please change the title "DATA PROCESSING WITH CONFIGURABLE REGISTERS" to be --DATA PROCESSING WITH RECONFIGURABLE REGISTERS--

Signed and Sealed this  
Twentieth Day of August, 2013

Teresa Stanek Rea  
*Acting Director of the United States Patent and Trademark Office*